United States Patent
Lv et al.

(10) Patent No.: US 9,868,519 B2
(45) Date of Patent: Jan. 16, 2018

(54) LINKAGE MECHANISM FOR DRIVING AIRCRAFT LANDING GEAR BAY DOOR

(71) Applicants: COMMERCIAL AIRCRAFT CORPORATION OF CHINA., LTD, Shanghai (CN); COMMERCIAL AIRCRAFT CORPORATION OF CHINA, LTD SHANGHAI AIRCRAFT DESIGN AND RESEARCH INSTITUTE, Shanghai (CN)

(72) Inventors: Jun Lv, Shanghai (CN); Qinggong Meng, Shanghai (CN); Pu Zhang, Shanghai (CN); Hao Jiang, Shanghai (CN); Shangxin Yang, Shanghai (CN); Hengkang Zhang, Shanghai (CN); Jian Ma, Shanghai (CN)

(73) Assignee: COMMERCIAL AIRCRAFT CORPORATION OF CHINA, LTD SHANGHAI AIRCRAFT DESIGN AND RESEARCH INSTITUTE, Shanghai (CN)

( * ) Notice: Subject to any disclaimer, the term of this patent is extended or adjusted under 35 U.S.C. 154(b) by 242 days.

(21) Appl. No.: 14/892,698

(22) PCT Filed: Aug. 20, 2014

(86) PCT No.: PCT/CN2014/084769
§ 371 (c)(1),
(2) Date: Nov. 20, 2015

(87) PCT Pub. No.: WO2015/058580
PCT Pub. Date: Apr. 30, 2015

(65) Prior Publication Data
US 2016/0129995 A1    May 12, 2016

(30) Foreign Application Priority Data

Oct. 25, 2013  (CN) .......................... 2013 1 0513351

(51) Int. Cl.
B64C 25/20    (2006.01)
B64C 25/16    (2006.01)
B64C 25/10    (2006.01)

(52) U.S. Cl.
CPC .............. *B64C 25/20* (2013.01); *B64C 25/10* (2013.01); *B64C 25/16* (2013.01)

(58) Field of Classification Search
CPC .......... B64C 25/10; B64C 25/16; B64C 25/20
See application file for complete search history.

(56) References Cited

U.S. PATENT DOCUMENTS 2,429,206 A * 10/1947 Lappin .................... B64C 25/20
                                              244/102 R
2,960,287 A * 11/1960 Barlow ................... B64C 25/20
                                              244/102 R
(Continued)

FOREIGN PATENT DOCUMENTS

CN    102239085 A    11/2011
CN    102470920 A    5/2012
(Continued)

OTHER PUBLICATIONS

International Search Report, dated Nov. 15, 2014.

*Primary Examiner* — Christopher P Ellis
*Assistant Examiner* — Michael H Wang
(74) *Attorney, Agent, or Firm* — Dority & Manning, P.A.

(57) ABSTRACT

A linkage mechanism for controlling an aircraft landing gear hatch door includes a primary torsion tube having a first portion located inside a landing gear hatch and a second portion outside the landing gear hatch. A first drive apparatus transfer the driving force of a landing gear support column (Continued)

to the primary torsion tube. A secondary torsion tube has an inner end portion located inside the hatch and an outer end portion located outside the hatch. A second drive apparatus is located outside the landing gear hatch and connects the primary torsion tube and the secondary torsion tube outside the hatch. Two third drive apparatuses are connected between the inner end portion of the secondary torsion tube and one of the hatch doors.

18 Claims, 8 Drawing Sheets

(56) References Cited

U.S. PATENT DOCUMENTS

| | | | | |
|---|---|---|---|---|
| 6,345,786 B1* | 2/2002 | Sakurai | ................... | B64C 25/16 244/100 R |
| 7,178,759 B2* | 2/2007 | Rouyre | ................... | B64C 25/16 244/100 R |
| 7,243,880 B2* | 7/2007 | White | ..................... | B64C 25/16 244/102 R |
| 7,677,497 B2* | 3/2010 | Santos Rubio | ......... | B64C 25/16 244/129.4 |
| 8,074,930 B2* | 12/2011 | Sibley | ................... | B64C 1/1407 244/102 R |
| 8,434,714 B2* | 5/2013 | Ekmedzic | ............... | B64C 25/10 244/100 R |
| 8,453,965 B2* | 6/2013 | Amberg | ................... | B64C 25/16 244/102 A |
| 8,888,040 B2* | 11/2014 | Gleyse | .................... | B64C 25/16 244/102 A |
| 2011/0127376 A1* | 6/2011 | Gleyse | .................... | B64C 25/16 244/102 R |

FOREIGN PATENT DOCUMENTS

| | | |
|---|---|---|
| CN | 103600837 A | 2/2014 |
| FR | 2886620 A1 | 12/2006 |
| WO | 2010063106 A | 6/2010 |
| WO | 2010063110 A1 | 6/2010 |

\* cited by examiner

LINKAGE MECHANISM FOR DRIVING AIRCRAFT LANDING GEAR BAY DOOR

CROSS-REFERENCE TO RELATED APPLICATIONS

This application claims priority to International Application Serial No. PCT/CN2014/084769, filed Aug. 20, 2014, which claims priority to Chinese Application No. 201310513351.8, filed Oct. 25, 2013. International Application Serial No. PCT/CN2014/084769 is hereby incorporated herein in its entirety for all purposes by this reference.

FIELD OF THE DISCLOSURE

The present invention relates to a linkage mechanism for driving an aircraft landing gear bay door so as to obtain the linkage between bay doors and an aircraft landing gear, and belongs to the field of landing gear structure design.

BACKGROUND OF THE DISCLOSURE

Generally, the aircraft landing gear bay doors of an aircraft have two kinds of structures: an independent structure and a linkage structure. The independent structure is designed in such a way that the bay doors of the landing gear are separately controlled to open and close independent of the retraction and release of the landing gear. The bay doors are opened before the retraction and release of the landing gear, and are closed after the retraction and release of the landing gear. The linkage structure is designed in such a way that a driving point is set on a retraction and release member of the landing gear such as a landing gear strut or a drag strut, and the bay doors are forced to open and close through a linkage mechanism by virtue of the movement of the retraction and release member of the landing gear, thereby obtaining a function of opening the bay door before the retraction and release of the landing gear and closing the bay door after the retraction and release of the landing gear. However, whatever the structures of the bay doors, they are arranged in a landing gear bay and have a symmetric configuration. In order to avoid the interference during the retraction and release of the landing gear, the landing gear bay must have enough space to arrange the linkage mechanism for driving the bay doors.

WO 2010/063110A1 discloses a driving device for a bay door of a landing gear with a linkage between the landing gear and the bay door. The driving device is arranged in a bay of the landing gear and has a symmetric configuration. However, in this patent, two bay doors of the bay of the landing gear are driven separately by two symmetric structures on two sides, that is, the two bay doors are respectively equipped with a driving mechanism which needs to be installed and adjusted, thereby causing a nonsynchronous movement between two driving mechanisms.

Patent application CN 102470920 A discloses a device for driving a bay door of an aircraft landing gear with a linkage between the door and the aircraft landing gear. The device is also arranged in the aircraft landing gear bay and has a symmetric configuration. In this driving device, a driven landing gear strut forces a panel of a breaker strut to pivot, thereby causing a generator lever 20' linked with the panel to pivot. This movement of the generator lever 20' is transmitted to a rocker lever 23' by a transferring rod 24', thus causing the rocker lever to pivot in a direction that tends to push against left and right links 25a' and 25b' symmetrically arranged and associated with the left and right bay doors, and thus open the doors. However, the movement needs to be transmitted from the landing gear strut to the transferring rod and to the rocker lever via an intermediate part such as the breaker strut, thus, on one hand, this device takes a relatively large space in the bay of the aircraft landing gear; on the other hand, the force cannot be transmitted directly, thereby affecting the force transferring performance.

BRIEF SUMMARY

The present invention provides a linkage mechanism used for driving an aircraft landing gear bay door, which can save the space in the landing gear bay and obtain a good force transferring performance.

For this purpose, according to one aspect of the present invention, the present invention provides a linkage mechanism used for driving an aircraft landing gear bay door, the linkage mechanism being suitable for connecting with bay doors and a landing gear and converting the back-and-forth movement of the landing gear between a retracted position inside of the landing gear bay and a released position outside of the landing gear bay, respectively into the back-and-forth movement of the bay doors between a closed position and an open position, the linkage mechanism comprising:

a primary torsion tube comprising a first portion located inside a landing gear bay and a second portion outside the landing gear bay;

a first drive apparatus connected between the first portion and a landing gear strut so as to transfer the driving force of the strut to the primary torsion tube;

a secondary torsion tube comprising an inner end portion located inside the bay and an outer end portion outside the bay;

a secondary drive apparatus connected between the outer end portion and the second portion for transmitting a torque of the primary torsion tube to the secondary torsion tube; and two third drive apparatuses respectively connected between the inner end portion of the secondary torsion tube and one of the bay doors so as to enable the bay doors to be driven by the secondary torsion tube for accomplishing the opening and closing movement.

According to this aspect of the present invention, the force transferring structure from the primary torsion tube to the secondary torsion tube is positioned outside of the landing gear bay, so the arrangement space in the landing gear bay can be saved to the utmost extent; the interference risk between the motion mechanisms can be reduced; the driving force of the landing gear strut is directly transmitted to the primary torsion tube via a first rod and a primary inner crank without being transmitted through the breaker strut as in the prior art, so the force transferring performance is good; and the torque is transmitted via one side, i.e., the torque is transmitted via one secondary torsion tube to control two bay doors simultaneously, so the quantity of parts is reduced, the space is saved, and the motion synchronism of the doors is high.

The first drive apparatus comprises a primary inner crank and a first rod, one end of the primary inner crank is securely connected to the first portion of the primary torsion tube, and two ends of the first rod are pivotally connected between the other end of the primary inner crank and the strut.

Preferably, the first rod is a L-shaped rod. The L-shaped rod may better prevent the linkage mechanism from interfering with the landing gear strut during the moving process.

Preferably, the L-shaped rod comprises a body portion and a moving portion removably connected with each other.

The L-shaped rod has a segmented design, and the length of the rod may be adjusted depending on the position of the whole machine.

Preferably, the body portion has a sliding hole and a first rack structure, and the moving portion has a screw hole and a second rack structure. The sliding hole is configured in such a way that a screw passing through the screw hole may slide along the sliding hole so as to adjust a connecting position of the body portion and the moving portion. In the connecting position, the first rack structure is engaged with the second rack structure, and the body portion and the moving portion are securely connected by the screw passing through the screw hole and the sliding hole. This configuration can change the connecting position by changing the engaging position of the rack structures so as to change the length of the rod, thereby further adjusting the position of the whole machine.

Preferably, the primary inner crank and the first portion of the primary torsion tube are connected with each other through the bolt by virtue of their respective lug structures. This flange type connecting structure enables the bolt to only suffer a shear force, thus each bolt bears a balanced force, so as to obtain a high strength and a good force transmission performance.

Preferably, the secondary drive apparatus comprises: a primary outer crank having one end securely connected to the second portion of the primary torsion tube; a secondary outer crank having one end securely connected to the outer end portion of the secondary torsion tube; and an intermediate rod having two ends pivotally connected between the other end of the primary outer crank and the other end of the secondary outer crank.

Preferably, each third drive apparatus comprises: a secondary inner crank having one end securely connected to the inner end portion of the secondary torsion tube; and a door rod having two ends pivotally connected between the other end of the secondary inner crank and one of the bay doors.

More preferably, the secondary inner crank and the inner end portion of the secondary torsion tube are connected with each other through the screw by virtue of their respective lug structures.

Preferably, the inner end portion of the secondary torsion tube are supported on two side walls of the landing gear bay by a ball bearing device, and the first portion and the second portion of the primary torsion tube are respectively supported on one side wall of the landing gear bay and an aircraft supporting structure outside of the side wall by a ball bearing device. Since the two ends of each torsion tube are fixed, this fixing form with two ends simply supported can better provide a supporting function to the torsion tubes and ensure a stable rotation of the torsion tubes.

BRIEF DESCRIPTION OF THE DRAWINGS

Other characteristics and advantages will become apparent from the following description of the invention. In the figures, the same reference signs indicate the same or similar parts, in which.

REFERENCE SIGNS

Figure 1:
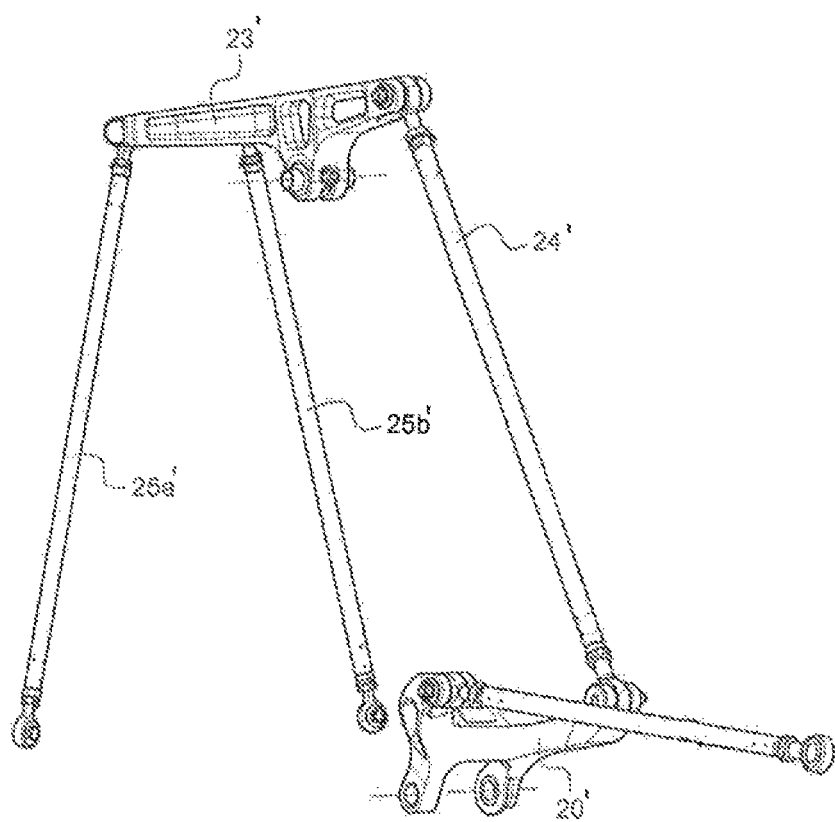
FIG. 1 is a perspective view of a mechanical linkage mechanism for driving an aircraft landing gear bay door in the prior art.

| | | | |
|---|---|---|---|
| 100 | linkage mechanism | | |
| 10 | primary torsion tube | | |
| 103 | torsion tube lug structure | | |
| 11 | primary inner crank | 113 | crank lug structure |
| 12 | first rod | | |
| 120 | body portion | 121 | moving portion |
| 123 | sliding hole | 124 | first rack structure |
| 125 | screw hole | 126 | screw |
| 13 | primary outer crank | | |
| 15 | bolt | | |
| 20 | secondary torsion tube | | |
| 21 | secondary outer crank | | |
| 22 | left inner crank | 23 | right inner crank |
| 24 | left door rod | 25 | right door rod |
| 30 | intermediate rod | | |
| 200 | landing gear | | |
| 201 | strut | | |
| 300 | aircraft supporting structure | | |
| 401 | left door | 402 | right door |
| 403 | side wall | | |

DETAILED DESCRIPTION OF EXEMPLARY EMBODIMENTS

The following description will describe the implementing and the applying of the detailed embodiments of the present invention. However, it should be appreciated that the described embodiments are only used to illustrate the special form for implementing and applying the present invention in an exemplary manner, rather than limit the scope of the present invention.

In the following description, the attached drawings are referred to. The drawings constitute a part of the present invention, and some specific embodiments for implementing the present invention are shown by way of example in the drawings. In this regard, some orientation terms, such as "left", "right", "top", "bottom", "front", "back", "guide", "forwards", and "backwards", are used with reference to the directions shown in the drawings. Thus, the members of the embodiments of the present invention may be arranged in different directions, and the orientation terms are used as example rather than limitation.

Figure 2:
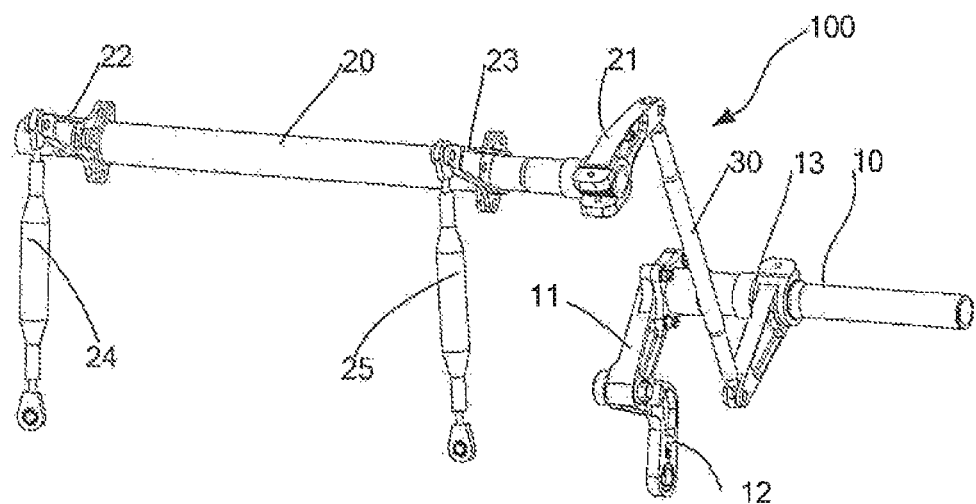
FIG. 2 is a schematic perspective view of a linkage mechanism for driving an aircraft landing gear bay door according to a preferred embodiment of the present invention.
Figure 3:
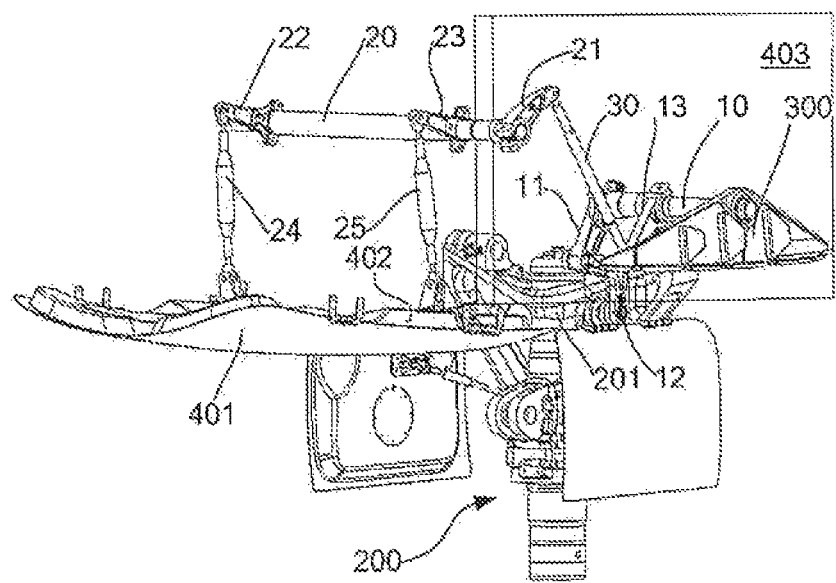
FIG. 3 is a schematic view showing the installation of the linkage mechanism for driving the aircraft landing gear bay as shown in FIG. 2.

FIGS. 2 and 3 illustrate a linkage mechanism 100 for driving an aircraft landing gear according to a preferred embodiment of the present invention. The linkage mechanism 100 is suitable for connecting with the bay doors and the landing gear and converting the back-and-forth movement of the landing gear between a retracted position inside of the landing gear bay and a released position outside of the landing gear bay, respectively into a back-and-forth movement of the bay doors between a closed position and an open position. The linkage mechanism 100 comprises a primary torsion tube 10 comprising a first portion positioned in a landing gear bay and a second portion positioned outside the landing gear bay; a first drive apparatus connected between the first portion and a strut 201 of the landing gear 200 in order to transmit the driving force of the strut 201 to the primary torsion tube 10; a secondary torsion tube 20 comprising an inner end portion positioned in the landing gear bay and an outer end portion positioned outside the landing gear bay; a secondary drive apparatus connected between the outer end portion of the secondary torsion tube 20 and the second portion of the primary torsion tube 10 for transmitting a torque of the primary torsion tube 10 to the secondary torsion tube 20; and two third drive apparatuses respectively connected between the inner end portion of the secondary torsion tube and one of bay doors so as to enable the bay doors to be driven by the secondary torsion tube for accomplishing the opening and closing movement.

Stilling referring to FIGS. 2 and 3, in this embodiment, the first drive apparatus preferably comprises a primary inner crank 11 and a first rod 12. One end of the primary inner crank 11 is securely connected to the first portion of the primary torsion tube 10, and the two ends of the first rod 12 are pivotally connected between the other end of the primary inner crank 11 and the strut 201.

As clearly shown in FIG. 2, the secondary drive apparatus preferably comprises a primary outer crank 13, a secondary outer crank 21 and an intermediate rod 30. One end of the primary outer crank 13 is securely connected to the second portion of the primary torsion tube 10; one end of the secondary outer crank 21 is securely connected to the outer end portion of the secondary torsion tube 20; and the two ends of the intermediate rod are pivotally connected between the other end of the primary outer crank 13 and the other end of the secondary outer crank 21.

Still referring to FIGS. 2 and 3, the two third drive apparatuses are a left drive apparatus and a right drive apparatus respectively. The left drive apparatus comprises a left inner crank 22 and a left door rod 24, one end of the left inner crank 22 is securely connected to the inner end portion of the secondary torsion tube 20, and two ends of the left door rod 24 are pivotally connected between the other end of the left inner crank 22 and a left door 401 (not shown). The right drive apparatus comprises a right inner crank 23 and a right door rod 25, one end of the right inner crank 23 is securely connected to the inner end portion of the secondary torsion tube 20, and the two ends of the right door rod 25 are pivotally connected between the other end of the right inner crank 23 and a right door 402.

Figure 4A:
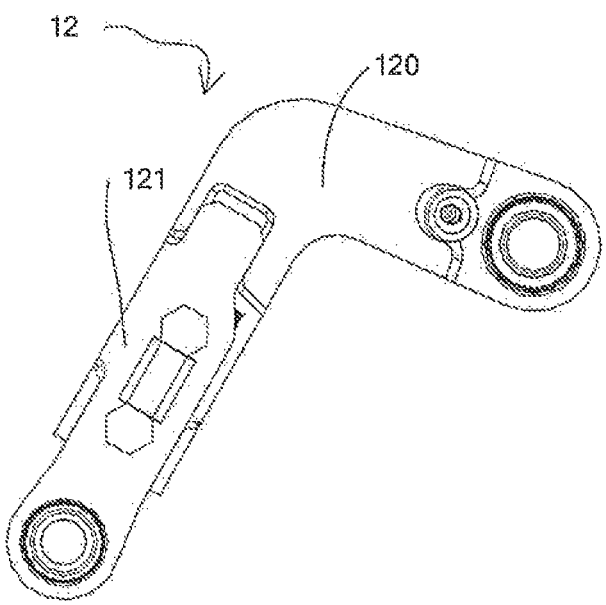
FIG. 4A is an enlarged view of a L-shaped rod of the linkage mechanism or driving the aircraft landing gear bay as shown in FIG. 2.
Figure 4B:
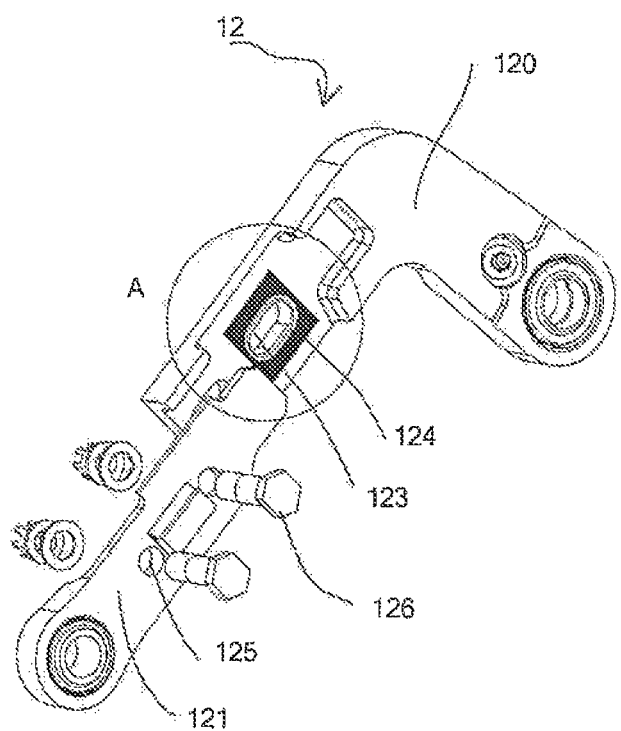
FIG. 4B is an exploded view of the L-shaped rod as shown in FIG. 4A.
Figure 4C:
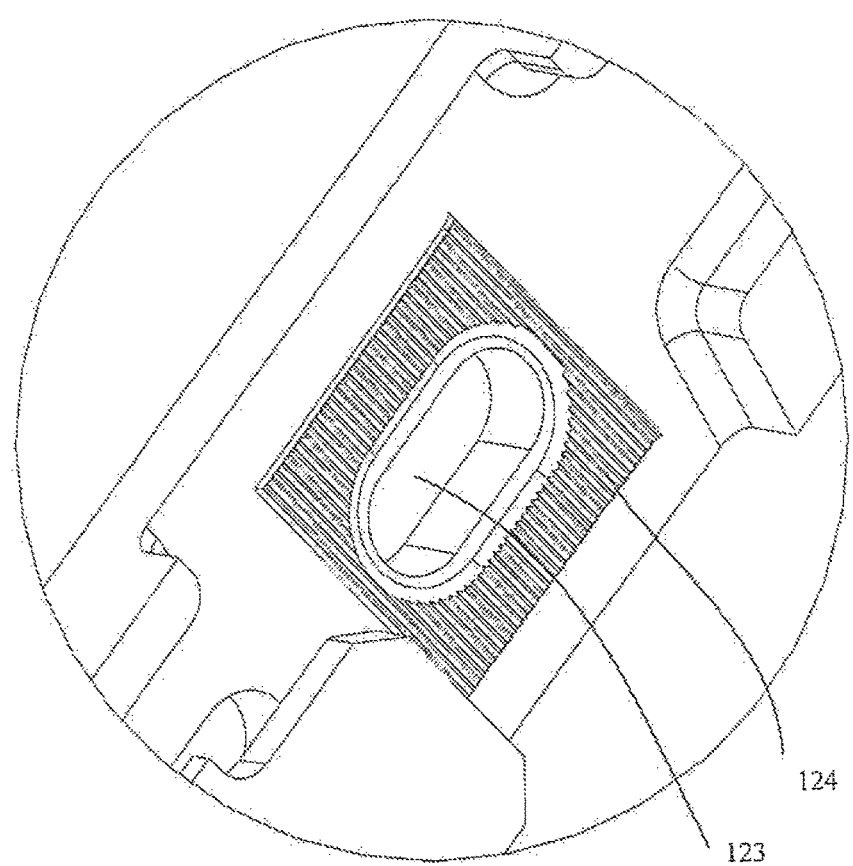
FIG. 4C is an enlarged view of portion A of the L-shaped rod as shown in FIG. 4A.

As shown in FIGS. 4A, 4B and 4C, in this embodiment, the first rod 12 is preferably a L-shaped rod and comprises a body portion 120 and a moving portion 121 removably connected with each other, that is to say, the first rod 12 has segmented design. The body portion 120 is provided with a sliding hole 123 and a first rack structure 124, and the moving portion 121 is provided with a screw hole 125 and a second rack structure (not shown). The sliding hole 123 is configured in such a way that a screw 126 passing through the screw hole 125 may slide along the sliding hole 123 so as to adjust a connecting position of the body portion 120 and the moving portion 121. In the connecting position, the first rack structure 124 is engaged with the second rack structure, and the body portion 120 and the moving portion 121 are securely connected by the screw 126 passing through the screw hole 125 and the sliding hole 123. This configuration can change the connecting position by changing the engaging position of the two rack structures so as to change the length of the first rod 12, thereby further adjusting the position of the whole machine. However, it should be appreciated that the first rod 12 may also be designed as a straight rod or other rods in case that the space in the landing gear bay is enough.

Figure 5:
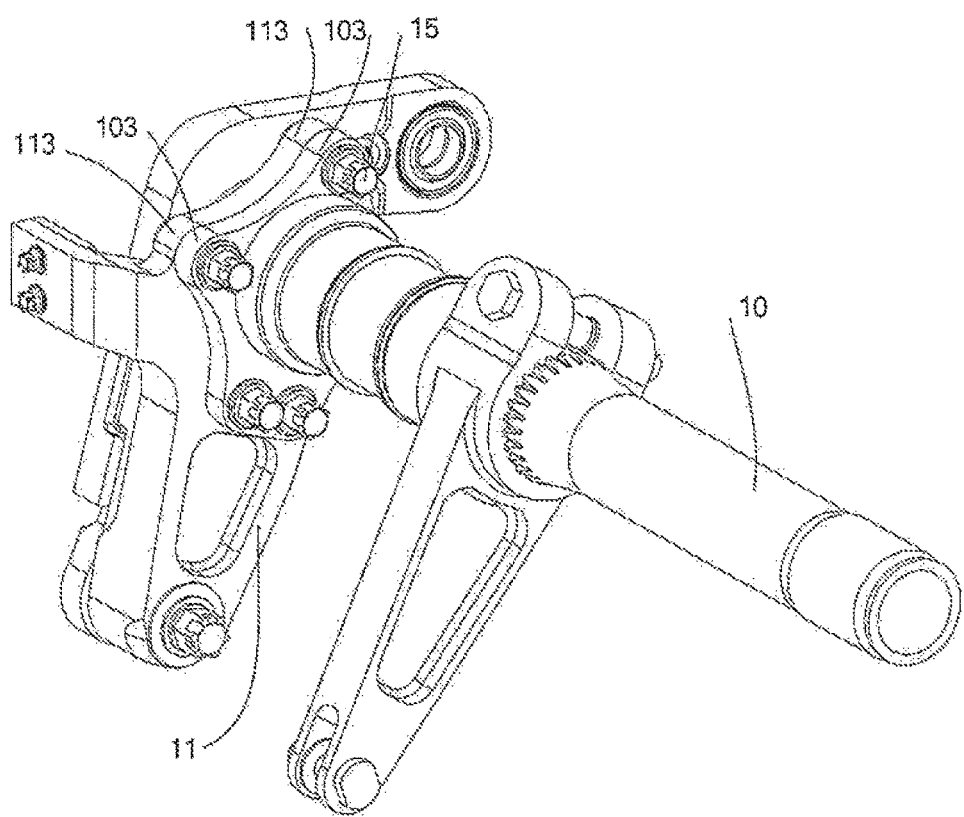
FIG. 5 is a schematic view showing the connection structure of a primary inner crank and a primary torsion tube of the linkage mechanism for driving the aircraft landing gear bay as shown in FIG. 2.
Figure 6:
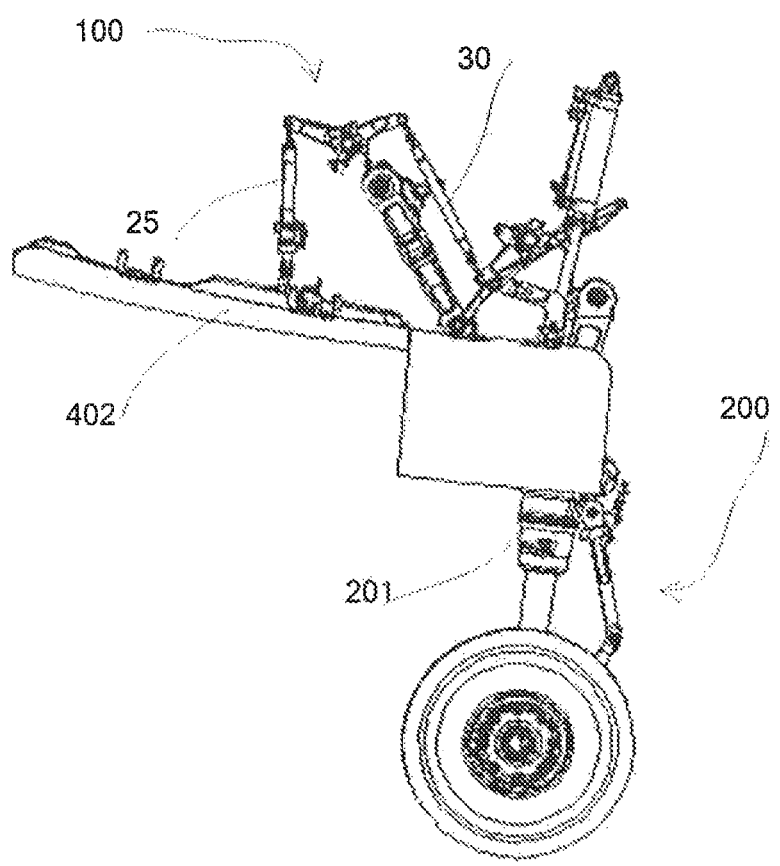
FIG. 6 is a perspective view of an landing gear equipped with the linkage mechanism for driving the aircraft landing gear bay as shown in FIG. 2, wherein the landing gear is shown in a released position.

As shown in FIG. 5, in this embodiment, the primary inner crank 11 preferably has a crank lug structure 113, and the primary torsion tube 10 preferably has a torsion tube lug structure 103, thus the primary inner crank 11 and the primary torsion tube 10 are connected through a bolt 15 by virtue of their respective lug structures. This flange type connecting structure enables the bolt 15 to only suffer a shear force, thus each bolt 15 bears a balanced force, so as to obtain a high strength and a good force transmission performance. Although FIG. 5 shows the connection structure between the primary inner crank 11 and the primary torsion tube 10, it should be appreciated that the connection structure between the left inner crank 22, the right inner crank 23 and the secondary torsion tube 20 may also be implemented through the bolt by virtue of their respective lug structures.

In this embodiment, the secondary torsion tube 20 is preferably supported on two side walls of the landing gear bay by a ball bearing device (not shown) in the interior of the left inner crank 22 and between the right inner crank 23 and the secondary outer crank 21. Further, the primary torsion tube 10 is supported on a corresponding side wall 403 of the landing gear bay by a ball bearing device between the primary inner crank 11 and the primary outer crank 13, and meanwhile, and the second portion of the primary torsion tube 10 in the landing gear bay is also preferably supported on an aircraft supporting structure 300 outside of the side wall 403 by a ball bearing device. Since the two ends of each torsion tube 10, 20 are fixed, this fixing form with two ends simply supported can better provide a supporting function to the torsion tubes 10, 20 and ensure a stable rotation of the torsion tubes 10, 20.

Returning to FIG. 3, although the outer end portion of the primary torsion tube 10 is fixed on the aircraft supporting structure 300 in a tripod form, it should be appreciated that the aircraft supporting structure 300 for fixing the primary torsion tube 10 is not limited to this structure, as long as it can support and fix the primary torsion tube 10 and prevent the primary torsion tube 10 that passes through the side wall 403 of the landing gear bay from swinging.

The following description will introduce the operating principle of the linkage mechanism in this embodiment with reference to FIGS. 6-8 and FIGS. 2-3.

Figure 7:
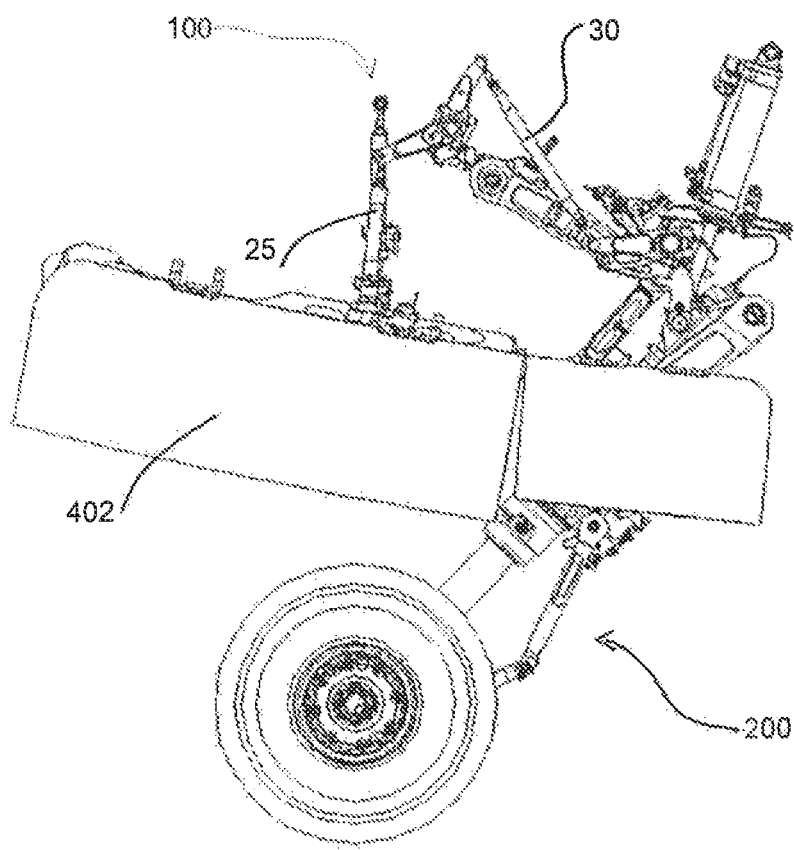
FIG. 7 is a schematic view showing the landing gear of FIG. 6 in an intermediate position.
Figure 8:
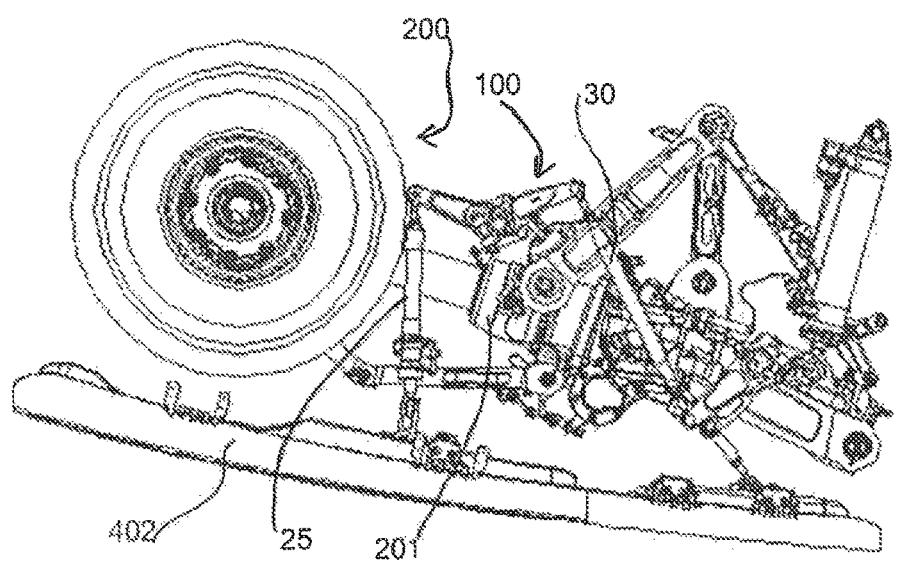
FIG. 8 is a schematic view showing the landing gear of FIG. 6 in a retracted position.

During the process of the landing gear 200 moving from a released position (see FIG. 6) to a retracted position (see FIG. 8) or from the retracted position to the released position (FIG. 7 shows an intermediate position), the strut 201 of the landing gear 200 forces the primary inner crank 11 to rotate via the first rod 12, and the primary torsion tube 10 transmits the torque of the primary inner crank 11 to the primary outer crank 13. Then, the primary outer crank 13 forces the secondary outer crank 21 to rotate via the intermediate rod 30, and the secondary torsion tube 20 transmits the torque to the left inner crank 22 and the right inner crank 23 simultaneously. Then, the two secondary inner cranks force the left door 401 and the right door 402 to move simultaneously via the left door rod 24 and the right door rod 25.

The linkage mechanism in this embodiment further has the following features: the linkage mechanism 100 is connected by two level cranks, and transmits the aerodynamic load (i.e., aerodynamic drag) of the doors to the landing gear strut using lever principle of the cranks, which effectively reduces the inhibition of the aerodynamic load of the doors to the normal retraction and release and emergency release of the landing gear and obtain a good force transferring performance.

It should be appreciated that the linkage mechanism of the present invention can be widely applied to the airplane, such as a front door of a front landing gear of an airliner, or a door of a center main landing gear of a wide-body airliner.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:

1. A linkage mechanism for driving an aircraft landing gear bay door, the linkage mechanism being suitable for connecting with bay doors that control access to the inside of a landing gear bay and with a landing gear and converting a back-and-forth movement of the landing gear between a retracted position inside of the landing gear bay and a released position outside of the landing gear bay, respectively into a back-and-forth movement of the bay doors between a closed position and an open position, the linkage mechanism comprising:
    a primary torsion tube comprising a first portion located inside the landing gear bay and a second portion outside the landing gear bay;
    a first drive apparatus connected between the first portion and a landing gear strut so as to transfer the driving force of the strut to the primary torsion tube;
    a secondary torsion tube comprising an inner end portion located inside the landing gear bay and an outer end portion outside the landing gear bay;
    a secondary drive apparatus connecting the outer end portion and the second portion for transmitting a torque of the primary torsion tube to the secondary torsion tube; and
    two third drive apparatuses respectively connected between the inner end portion of the secondary torsion tube and one of the bay doors so as to enable the bay doors to be driven by the secondary torsion tube for accomplishing the opening and closing movement.

2. The linkage mechanism for driving an aircraft landing gear bay door according to claim 1, wherein the first drive apparatus comprises:
    a primary inner crank having opposed ends with one of the opposed ends securely connected to the first portion of the primary torsion tube; and
    a first rod having two ends, one end of the first rod being pivotally connected between the other end of the primary inner crank and the other end of the first rod being pivotally connected to the strut.

3. The linkage mechanism for driving an aircraft landing gear bay door according to claim 2, wherein the first rod is a L-shaped rod.

4. The linkage mechanism for driving an aircraft landing gear bay door according to claim 3, wherein the L-shaped rod comprises a body portion and a moving portion removably connected with each other.

5. The linkage mechanism for driving an aircraft landing gear bay door according to claim 4, wherein the body portion has a sliding hole and a first rack structure, and the moving portion has a screw hole and a second rack structure, the sliding hole being configured in such a way that a screw passing through the screw hole may slide along the sliding hole so as to adjust a connecting position of the body portion and the moving portion, and in the connecting position, the first rack structure being engaged with the second rack structure, and the body portion and the moving portion being securely tightened by the screw passing through the screw hole and the sliding hole.

6. The linkage mechanism for driving an aircraft landing gear bay door according to claim 5, wherein the inner end portion of the secondary torsion tube is supported on two side walls of the landing gear bay by a ball bearing device, and the first portion and the second portion of the primary torsion tube are respectively supported on one side wall of the landing gear bay and an aircraft supporting structure outside of the side wall by a ball bearing device.

7. The linkage mechanism for driving an aircraft landing gear bay door according to claim 4 wherein the inner end portion of the secondary torsion tube is supported on two side walls of the landing gear bay by a ball bearing device, and the first portion and the second portion of the primary torsion tube are respectively supported on one side wall of the landing gear bay and an aircraft supporting structure outside of the side wall by a ball bearing device.

8. The linkage mechanism for driving an aircraft landing gear bay door according to claim 3, wherein the inner end portion of the secondary torsion tube is supported on two side walls of the landing gear bay by a ball bearing device, and the first portion and the second portion of the primary torsion tube are respectively supported on one side wall of the landing gear bay and an aircraft supporting structure outside of the side wall by a ball bearing device.

9. The linkage mechanism for driving an aircraft landing gear bay door according to claim 2, wherein the primary inner crank and the first portion of the primary torsion tube are connected with each other through a bolt by virtue of their respective lug structures.

10. The linkage mechanism for driving an aircraft landing gear bay door according to claim 9, wherein the inner end portion of the secondary torsion tube is supported on two side walls of the landing gear bay by a ball bearing device, and the first portion and the second portion of the primary torsion tube are respectively supported on one side wall of the landing gear bay and an aircraft supporting structure outside of the side wall by a ball bearing device.

11. The linkage mechanism for driving an aircraft landing gear bay door according to claim 2, wherein the inner end portion of the secondary torsion tube is supported on two side walls of the landing gear bay by a ball bearing device, and the first portion and the second portion of the primary torsion tube are respectively supported on one side wall of the landing gear bay and an aircraft supporting structure outside of the side wall by a ball bearing device.

12. The linkage mechanism for driving an aircraft landing gear bay door according to claim 1, wherein the secondary drive apparatus comprises:
    a primary outer crank having two ends, one end securely connected to the second portion of the primary torsion tube;

a secondary outer crank having two ends, one end securely connected to the outer end portion of the secondary torsion tube; and an intermediate rod having two ends, one end of the intermediate rod being pivotally connected two the other end of the primary outer crank and the other end of the intermediate rod being pivotally connected to the other end of the secondary outer crank.

13. The linkage mechanism for driving an aircraft landing gear bay door according to claim 12, wherein the inner end portion of the secondary torsion tube is supported on two side walls of the landing gear bay by a ball bearing device, and the first portion and the second portion of the primary torsion tube are respectively supported on one side wall of the landing gear bay and an aircraft supporting structure outside of the side wall by a ball bearing device.

14. The linkage mechanism for driving an aircraft landing gear bay door according to claim 1, wherein each third drive apparatus comprises:

a secondary inner crank having one end securely connected to the inner end portion of the secondary torsion tube; and a bay door rod having two ends, one end of the bay door rod being pivotally connected two the other end of the secondary inner crank and the other end of the bay door rod being pivotally connected to one of the bay doors.

15. The linkage mechanism for driving an aircraft landing gear bay door according to claim 14, wherein the secondary inner crank and the inner end portion of the secondary torsion tube are connected with each other through a bolt by virtue of their respective lug structures.

16. The linkage mechanism for driving an aircraft landing gear bay door according to claim 15, wherein the inner end portion of the secondary torsion tube is supported on two side walls of the landing gear bay by a ball bearing device, and the first portion and the second portion of the primary torsion tube are respectively supported on one side wall of the landing gear bay and an aircraft supporting structure outside of the side wall by a ball bearing device.

17. The linkage mechanism for driving an aircraft landing gear bay door according to claim 14, wherein the inner end portion of the secondary torsion tube is supported on two side walls of the landing gear bay by a ball bearing device, and the first portion and the second portion of the primary torsion tube are respectively supported on one side wall of the landing gear bay and an aircraft supporting structure outside of the side wall by a ball bearing device.

18. The linkage mechanism for driving an aircraft landing gear bay door according to claim 1, wherein the inner end portion of the secondary torsion tube is supported on two side walls of the landing gear bay by a ball bearing device, and the first portion and the second portion of the primary torsion tube are respectively supported on one side wall of the landing gear bay and an aircraft supporting structure outside of the side wall by a ball bearing device.

* * * * *